(12) United States Patent
Liao

(10) Patent No.: US 7,477,459 B2
(45) Date of Patent: Jan. 13, 2009

(54) MICRO LENS

(75) Inventor: Chen-Cheng Liao, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 52 days.

(21) Appl. No.: 11/750,373

(22) Filed: May 18, 2007

(65) Prior Publication Data
US 2008/0174884 A1  Jul. 24, 2008

(30) Foreign Application Priority Data
Jan. 23, 2007  (TW) .............................. 96102541 A

(51) Int. Cl.
G02B 9/34 (2006.01)
(52) U.S. Cl. ...................... 359/773; 359/772
(58) Field of Classification Search ................ 359/757, 359/756, 764, 766, 763, 772, 773
See application file for complete search history.

(56) References Cited
U.S. PATENT DOCUMENTS
5,392,431 A * 2/1995 Pfisterer ...................... 359/653
6,441,971 B2 8/2002 Ning
6,744,570 B1 * 6/2004 Isono ......................... 359/772

* cited by examiner

Primary Examiner—Darryl J Collins
(74) Attorney, Agent, or Firm—Thomas, Kayden, Horstemeyer & Risley

(57) ABSTRACT

A micro lens, from an object side to an image side, sequentially includes a stop, a first lens having a positive refractive power, a second lens having a negative refractive power, a third lens having a positive refractive power, and a fourth lens having a negative refractive power. The third and fourth lenses respectively comprise at least one aspherical surface. The negative refractive power gradually decreases from the center to the periphery of the fourth lens, and the refractive power of the periphery of the fourth lens is turned to positive. The relationship of the first lens and the focal length of the micro lens of the micro lens and the relationship of the third lens and the first lens satisfy the desired requirements, thus, to reduce the total length of the micro lens, tolerance sensitivity and cost.

19 Claims, 4 Drawing Sheets

MICRO LENS

BACKGROUND OF THE INVENTION

1. Field of the Invention

The invention relates to a micro lens, and more particularly to a micro lens suitable for installation in a portable electronic device.

2. Description of the Related Art

With the progress of the technical skills, portable electronic devices such as notebook computers, mobile phones or personal digital assistants incorporating electro-optical technologies have proliferated. A mobile phone with camera, for example, offers high-resolution optics, and is lightweight and inexpensive.

A spherical lens is typically used in a camera, however, optical defects such as spherical image aberration and axial diffraction cause blurry images and out of focus images, thus additional lenses are provided for compensating image aberration. Traditionally, image quality can be improved by increasing the length, outer diameter, weight and cost of the lens, however, the total weight and cost of the camera are relatively increased. Clumsy and heavy lens are no longer a trend in the present market.

To attain a small camera with low manufacturing cost, the total length of the lens must be reduced. An aspherical lens can overcome spherical image aberration caused by a spherical lens. Further, a single aspherical lens can compensate for spherical image aberration requiring several spherical lenses. Thus, the size, weight and optical design of the lens can be simplified.

spherical and aspherical lenses can be made of glass and plastic. A glass lens typically provides a greater light-transmission coefficient and a better image quality than plastic. Glass and plastic lenses are assembled to form a desired lens based on material characteristics.

Current mobile phones typically employ glass and plastic lenses such as 1G(glass)2P(plastic) or 1G3P. U.S. Pat. No. 6,441,971 discloses a compact lens assembly related to 1G2P. From an object side to an image side, the compact lens assembly sequentially comprises a first lens element, a second lens element and a third lens element. The first lens element is a glass spherical lens, and the second and third lens elements are plastic aspherical lenses. The compact lens assembly is tiny and only suitable for an image sensor having a resolution of about 640×480 pixels. Although the 1G3P lens can provide good resolution, the weight and cost of the 1G3P is still high.

BRIEF SUMMARY OF THE INVENTION

The invention provides a low cost micro lens with, low tolerance sensitivity, small total length and high resolution.

From an object side to an image side, the micro lens sequentially comprises a stop, a first lens having a positive refractive power, a second lens having a negative refractive power, a third lens having a positive refractive power, and a fourth lens having a negative refractive power. The third and fourth lenses respectively comprise at least one aspherical surface, and the negative refractive power gradually decreases from the center to the periphery of the fourth lens. The micro lens satisfies the condition $1.0<F/f1<2.5$, wherein "F" represents a focal length of the micro lens, and f1 represents a focal length of the first lens.

The micro lens is further satisfies the condition $0.6<f3/f1<2.0$, wherein f3 represents a focal length of the third lens, and f1 represents a focal length of the first lens.

The refractive indexes of the first, second, third and fourth lenses at d-lines are less than 1.6. The first, second, third and fourth lenses are plastic lenses. The first, second, third and fourth lenses are all designed to be double-sided and aspherical. The fourth lens has a periphery with positive refractive power. The second lens is a biconcave lens, and the first lens is a biconvex lens.

The micro lens may further comprise a flat glass plate disposed on the image side of the fourth lens, and an image position and an image-sensing element disposed on the image position.

Compared with the conventional skills, the micro lens of the invention provides a focal length ratio of the first lens and focal length of the micro lens to satisfy requirements, thus, the total length of the micro lens, tolerance sensitivity and cost are reduced. Further, the relationship of the third lens and the first lens must satisfy additional requirements, thus, reducing the total length of the micro lens and tolerance sensitivity. The negative refractive power gradually decreases from the center to the periphery of the fourth lens, thereby increasing the resolution of imaged surfaces located on the same surface. Further, refractive indexes of the first, second, third and fourth lenses of the micro lens of the invention at d-lines can be less than 1.6, thus, cost and weight of the micro lens are reduced.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
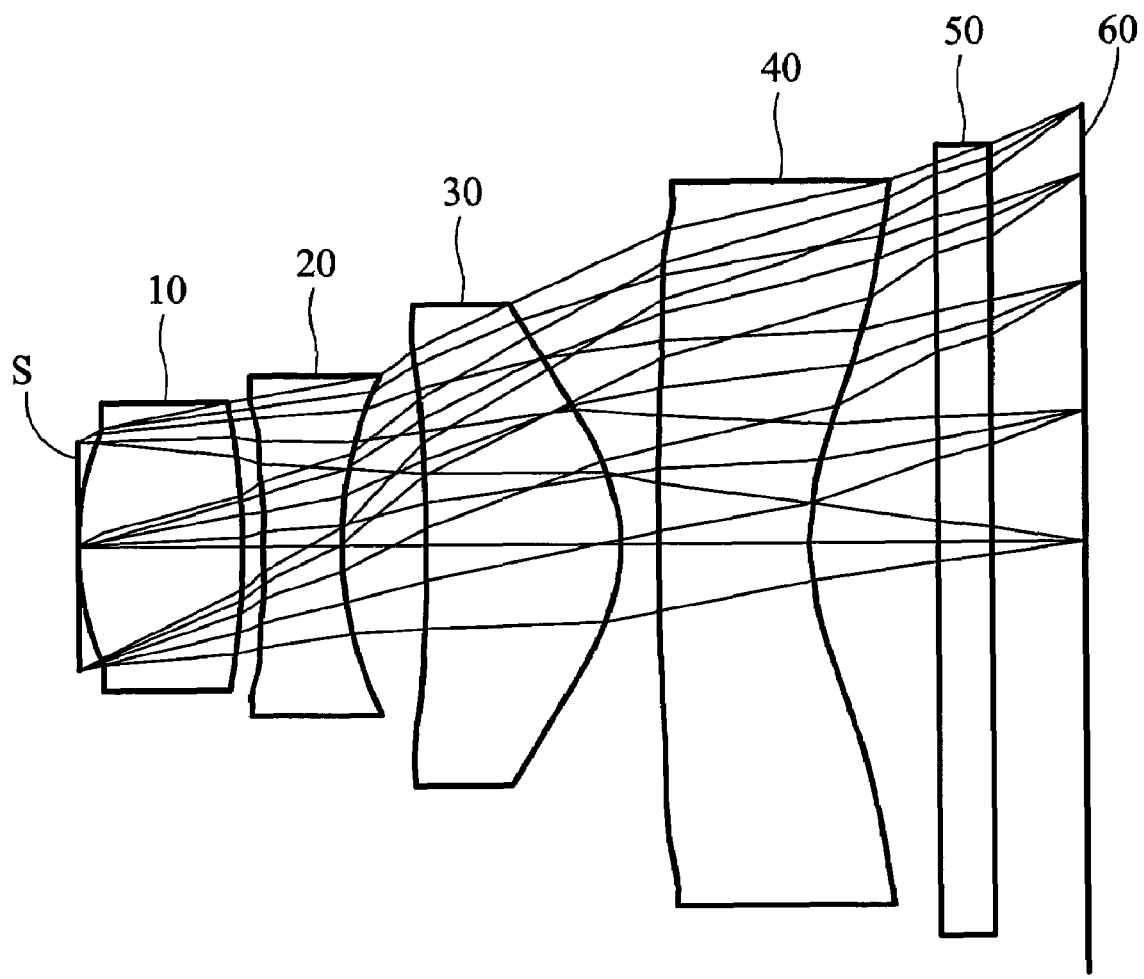
FIG. 1 is a schematic view of a micro lens of the invention.

In FIG. 1, a micro lens 1, from an object side to an image side, sequentially comprises a leading end, a stop "S" disposed on the leading end, a first lens 10 having a positive refractive power, a second lens 20 having a negative refractive power, a third lens 30 having a positive refractive power, a fourth lens 40 having a negative refractive power, a parallel plate 50, and an imaged surface 60.

The first lens 10 is a biconvex lens capable of providing main refraction power for the entire optical system and capturing images. The second lens 20 is a biconcave lens capable of compensating chromatic aberration and correcting off-axis aberration. The third lens 30 is a positive lens providing at least one aspherical surface. Compared to the conventional 1G3P lens providing refraction power only based on the first lens 10, the third lens 30 of the micro lens 1 is capable of providing a predetermined refraction power for the entire optical system, thus, the tolerance sensitivity of the first lens 10 is reduced. The fourth lens 40 is a minus lens providing at least one aspherical surface to precisely focus light beams at the imaged surface. Note that even though the fourth lens 40 is the minus lens, the negative refractive power gradually decreases from the center to the periphery of the fourth lens 40, and the refractive power of the periphery of the fourth lens 40 is turned to positive. The imaged surfaces formed at the center and peripheries of the fourth lens 40 in each image field are located on the same surface, i.e., the imaged surface is not bent, thus, image resolution is increased.

The parallel plate 50 is a flat glass plate providing at least one surface coated with a thin film exhibiting a desired function such as anti-reflection or infrared filtering for increasing image quality. The imaged surface 60, located at the image side is a surface of an image-sensing element such as charge coupled device (CCD) or complementary metal-oxide semiconductor (CMOS). CMOS image sensors are typically employed in mobile phones due cost considerations.

To attain a short length, minimum tolerance sensitivity and high resolution micro lens, the micro lens 1 satisfies the following conditions:

$$1.0 < F/f1 < 2.5 \quad (1)$$

$$0.6 < f3/f1 < 2.0 \quad (2)$$

In the formula (1), symbol "F" represents a focal length of the micro lens, and f1 represents a focal length of the first lens 10. When F/f1 is larger than 1.0 (upper limit), the total length of the micro lens 1 is increased and does not meet the described requirement. When F/f1 is less than 2.5 (lower limit), the first lens 10 must bear the majority of the refraction power from the micro lens 1, thus, sensitivity of the first lens 10 is largely increased and the periphery thickness is insufficient. Note that formation of the first lens 10 with small thickness is difficult.

In the formula (2), f3 represents a focal length of the third lens 30, and f1 represents a focal length of the first lens 10. When f3/f1 is larger than 0.6 (upper limit), sensitivity of the first lens 10 is largely increased. When f3/f1 is less than 2.0 (lower limit), the total length of the micro lens 1 is increased.

Based on the described features, the micro lens 1 provides a large viewing angle (about 60 degrees), large numerical aperture (about 1:2.8), low manufacturing sensitivity and low cost. The micro lens 1 is assembled by the described first, second, third and fourth lenses 10, 20, 30 and 40, and the refractive indexes of the first, second, third and fourth lenses 10, 20, 30 and 40 at d-lines of the micro lens 1 are less than 1.6 and the resolution of the micro lens 1 is still high. Note that the first, second, third and fourth lenses 10, 20, 30 and 40 of the micro lens 1 can be plastic for decreasing the cost and weight of the micro lens 1.

The third and fourth lenses 30 and 40 of the micro lens 1 respectively comprise at least one aspherical surface satisfying the following aspherical formula:

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

wherein "h" represents the height of the lens; "z" represents a displacement measured with respect to an optical axis with reference to a surface vertex along the optical axis at the height "h"; "A" represents $4^{th}$ order aspherical coefficient; "B" represents $6^{th}$ order aspherical coefficient; "C" represents $8^{th}$ order aspherical coefficient; "D" represents $10^{th}$ order aspherical coefficient; "E" represents $12^{th}$ order aspherical coefficient; "F" represents $14^{th}$ order aspherical coefficient; and "G" represents $16^{th}$ order aspherical coefficient.

In the following description, surface numerals 1 to 10 represent the stop "S", a surface of the first lens 10 approaching the object side, a surface of the first lens 10 approaching the image side, a surface of the second lens 20 approaching the object side, a surface of the second lens 20 approaching the image side, a surface of the third lens 30 approaching the object side, a surface of the third lens 30 approaching the image side, a surface of the fourth lens 40 approaching the object side, a surface of the fourth lens 40 approaching the image side, and a surface of the parallel plate 50 approaching the object side.

In the following description, the micro lens 1 is depicted having a first value and a second value respectively, and the described refractive indexes represent the refractive index as appearing at d-lines of the micro lens 1. The position of d-line of the first, second, third and fourth lenses 10, 20, 30 and 40 is 587.56 nm.

The data of the first embodiment of the micro lens 1 with the first value is depicted in Table 1.1.

TABLE 1.1

| Surface numerals (No.) | Radius (mm) | Thickness (mm) | Refraction Rate (Nd) | Abbe Number (Vd) |
|---|---|---|---|---|
| 1 | ∞ | 0.0 | | |
| 2 | 2.210 | 1.044 | 1.5247 | 56.2 |
| 3 | −4.874 | 0.14 | | |
| 4 | −26.360 | 0.43 | 1.5855 | 29.9 |
| 5 | −1.981 | 0.479 | | |
| 6 | −9.20 | 1.166 | 1.5146 | 57.2 |
| 7 | −1.205 | 0.21 | | |
| 8 | 34.766 | 0.981 | 1.5146 | 57.2 |
| 9 | 1.560 | 1.25 | | |
| 10 | ∞ | 0.35 | 1.51633 | 64.1 |

In the table 1.1, the second, third and fourth lenses 20, 30 and 40 are provided with aspherical surfaces, and the substantial values of the aspherical surface coefficients are given in the following.

Surface numeral No. 4 (object side of the second lens 20):

| | | | |
|---|---|---|---|
| k = −236.495951 | A = −0.127541 | B = 0.134796 | C = −0.258499 |
| D = 0.415821 | E = −0.387164 | F = 0.148766 | G = 0 |

Surface numeral No. 5 (image side of the second lens 20):

| | | | |
|---|---|---|---|
| k = −0.976447 | A = −0.102675 | B = 0.106806 | C = −0.068770 |
| D = 0.019156 | E = 0 | F = 0 | G = 0 |

Surface numeral No. 6 (object side of the third lens 30):

| | | | |
|---|---|---|---|
| k = −15.594077 | A = −0.003746 | B = 0.062067 | C = −0.161307 |
| D = 0.249450 | E = −0.194650 | F = 0.073744 | G = −0.011029 |

Surface numeral No. 7 (image side of the third lens 30):

| k = −1.0 | A = 0.115871 | B = −0.094584 | C = 0.069083 |
|---|---|---|---|
| D = −0.046664 | E = 0.028782 | F = −0.009893 | G = 0.001283 |

Surface numeral No. 8 (object side of the fourth lens 40):

| k = 253.905972 | A = 0.023584 | B = −0.038938 | C = 0.017121 |
|---|---|---|---|
| D = −0.001093 | E = −0.001125 | F = 0.000303 | G = −2.3762E−5 |

Surface numeral No. 9 (image side of the fourth lens 40):

| k = −5.374432 | A = −0.041373 | B = 0.022695 | C = −0.013576 |
|---|---|---|---|
| D = 0.004933 | E = −9.9034E−4 | F = 1.02363E−4 | G = −4.259E−6 |

Based on the Table 1.1, the further data can be obtained as following Table. 1.2:

TABLE 1.2

| Systematic Focal length (F) | 4.445 mm |
|---|---|
| View Angle (F.O.V) | 65 degree |
| Total length | 6.0 mm |
| F-number | 2.87 |
| F/f1 | 1.456 |
| f3/f1 | 0.84 |

Figure 2A:
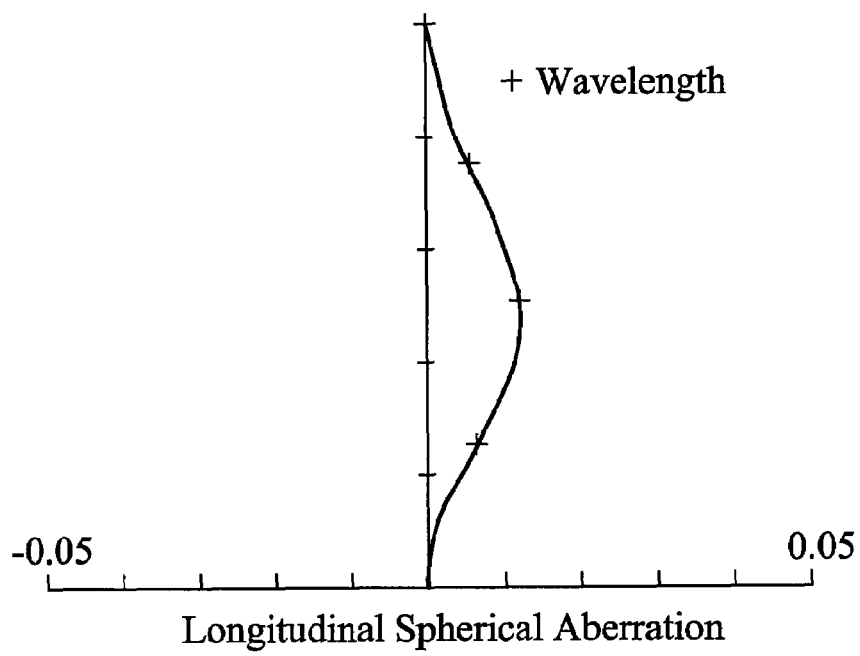
FIGS. 2A to 2C are schematic views of curves of longitudinal spherical aberration, image filed sag and transverse chromatic aberration based on a first value of a first embodiment of the micro lens of the invention.
Figure 2B:
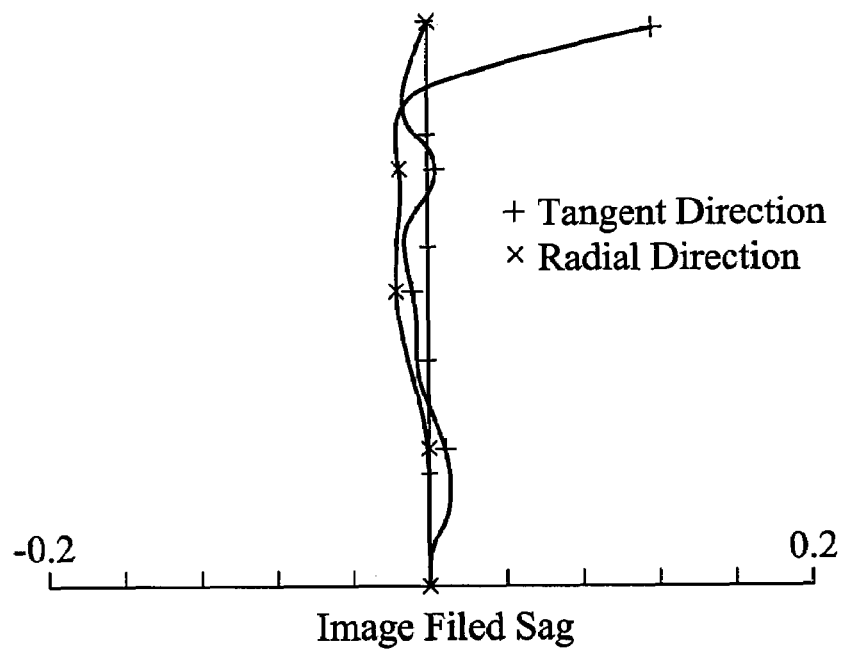
Figure 2C:
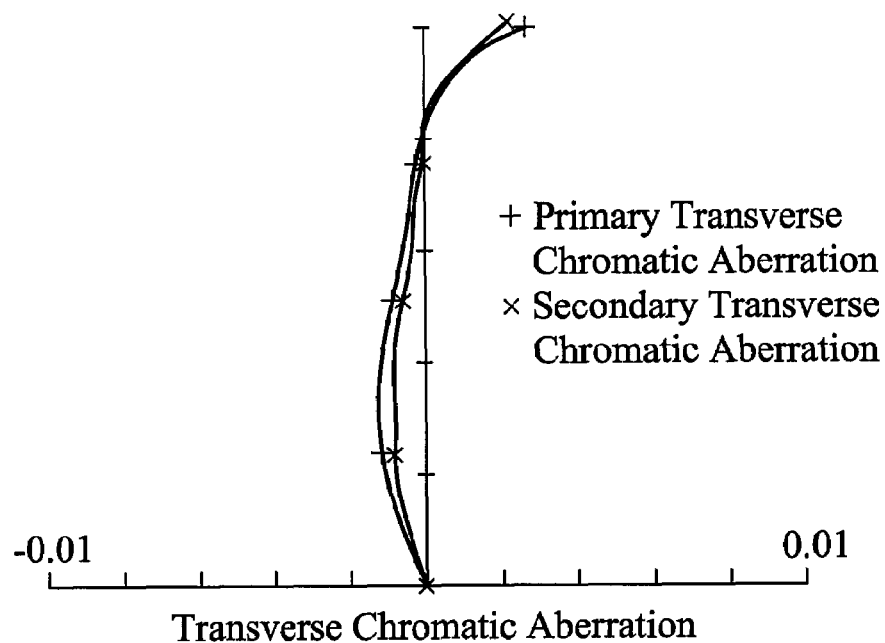

Based on the first value of the first embodiment of the micro lens 1, longitudinal spherical aberration, image filed sag and transverse chromatic aberration of the micro lens 1 are effectively corrected. The curves of the corrected longitudinal spherical aberration, image filed sag and transverse chromatic aberration of the micro lens 1 is presented in FIGS. 2A to 2C.

The data of the second embodiment of the micro lens 1 with the second value is depicted in Table 2.1.

TABLE 2.1

| Surface numerals (No.) | Radius (mm) | Thickness (mm) | Refraction Rate (Nd) | Abbe Number (Vd) |
|---|---|---|---|---|
| 1 | ∞ | 0.0 | | |
| 2 | 2.20 | 1.0 | 1.5247 | 56.2 |
| 3 | −4.882 | 0.13 | | |
| 4 | −16.065 | 0.43 | 1.5855 | 29.9 |
| 5 | −2.175 | 0.52 | | |
| 6 | −9.478 | 1.188 | 1.5146 | 57.2 |
| 7 | −1.192 | 0.193 | | |
| 8 | 30.354 | 0.942 | 1.5146 | 57.2 |
| 9 | 1.432 | 1.288 | | |
| 10 | ∞ | 0.35 | 1.51633 | 64.1 |

In the table 2.1, the first, second, third and fourth lenses 20, 30 and 40 are provided with aspherical surfaces, and the substantial values of the aspherical surface coefficients are given as follows:

Surface numeral No. 2 (object side of the first lens 10):

| k = 0 | A = 8.0017E−4 | B = −0.014842 | C = 0.012520 |
|---|---|---|---|
| D = 0 | E = 0 | F = 0 | G = 0 |

Surface numeral No. 2 (image side of the first lens 10):

| k = −2.842547 | A = 0 | B = 0 | C = 0 |
|---|---|---|---|
| D = 0 | E = 0 | F = 0 | G = 0 |

Surface numeral No. 4 (object side of the second lens 20):

| k = −239.922008 | A = −0.105379 | B = 0.152025 | C = −0.254659 |
|---|---|---|---|
| D = 0.377689 | E = −0.369318 | F = 0.151686 | G = 0 |

Surface numeral No. 5 (image side of the second lens 20):

| k = −1 | A = −0.082571 | B = 0.109396 | C = −0.070684 |
|---|---|---|---|
| D = 0.016126 | E = 0.001127 | F = 0 | G = 0 |

Surface numeral No. 6 (object side of the third lens 30):

| k = 3.732257 | A = −0.014746 | B = 0.064022 | C = −0.162158 |
|---|---|---|---|
| D = 0.249681 | E = −0.194584 | F = 0.073494 | G = −0.010983 |

Surface numeral No. 7 (image side of the third lens 30):

| k = −1.0 | A = 0.126493 | B = −0.097612 | C = 0.068339 |
|---|---|---|---|
| D = −0.046616 | E = 0.028657 | F = −0.009882 | G = 0.001298 |

Surface numeral No. 8 (object side of the fourth lens 40):

| k = 196.185890 | A = 0.027676 | B = −0.038170 | C = 0.016871 |
|---|---|---|---|
| D = −0.0011146 | E = −0.001118 | F = 0.000308 | G = −2.4375E−5 |

Surface numeral No. 9 (image side of the fourth lens 40):

| k = −4.75279 | A = −0.043467 | B = 0.025180 | C = −0.013795 |
|---|---|---|---|
| D = 0.004894 | E = −9.88393E−4 | F = 1.03853E−4 | G = −4.4186E−6 |

Based on the Table 2.1, further data can be obtained as shown in Table 2.2:

TABLE 2.2

| Systematic Focal length (F) | 4.482 mm |
|---|---|
| View Angle (F.O.V) | 65 degree |
| Total Length | 6.0 mm |
| F-number | 2.84 |
| F/f1 | 1.475 |
| f3/f1 | 0.832 |

Figure 3A:
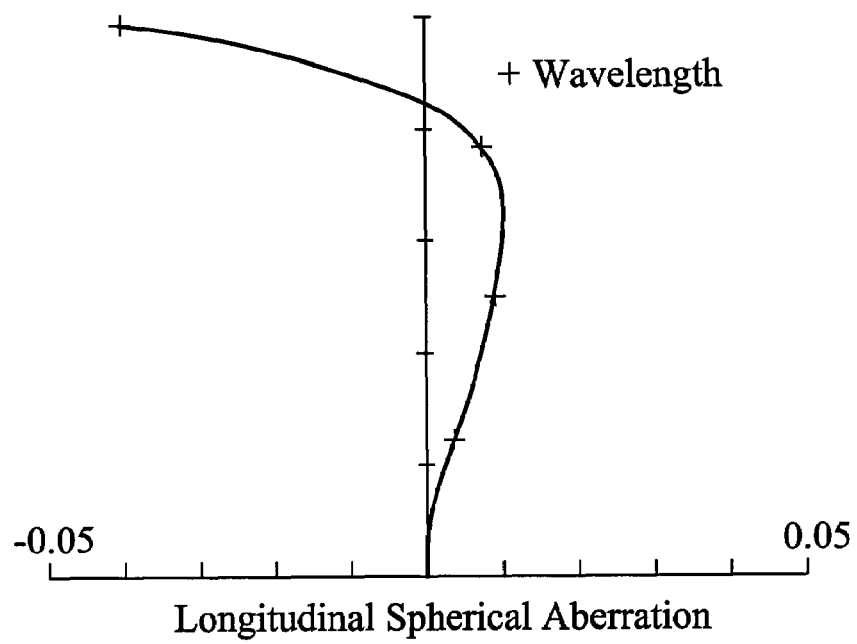
FIGS. 3A to 3C are schematic views of curves of longitudinal spherical aberration, image field sag and transverse chromatic aberration based on a second value of a second embodiment of the micro lens of the invention.
Figure 3B:
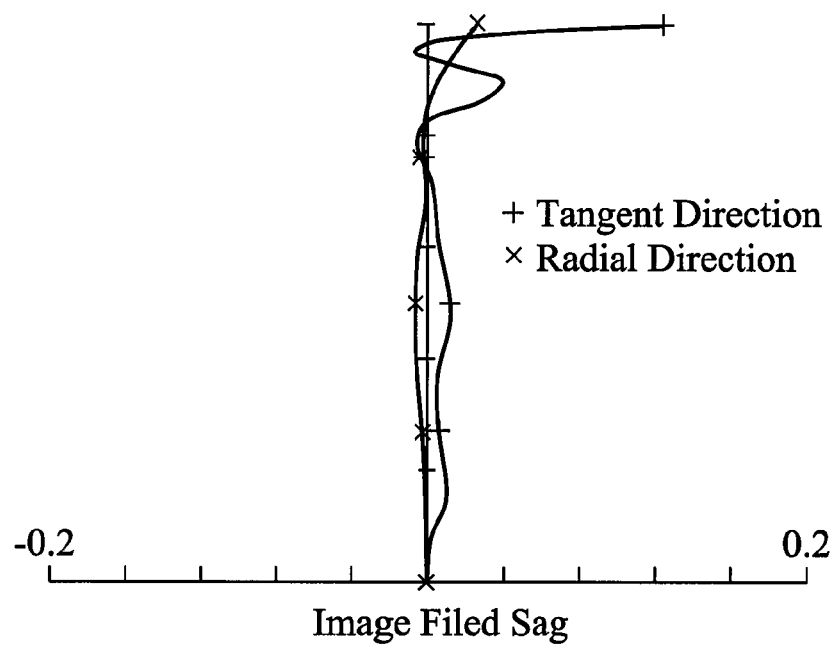
Figure 3C:
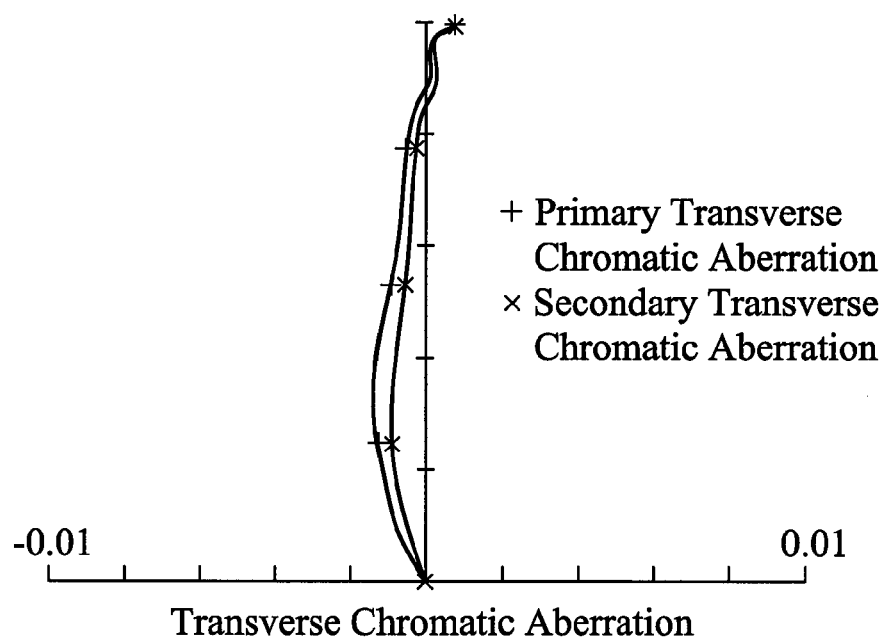

Based on the second value of the second embodiment of the micro lens 1, longitudinal spherical aberration, image filed sag and transverse chromatic aberration of the micro lens 1 are effectively corrected. The curves of the corrected longitudinal spherical aberration, image filed sag and transverse chromatic aberration of the micro lens 1 is presented in FIGS. 3A to 3C.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro lens, from an object side to an image side, sequentially comprising a stop, a first lens having a positive refractive power, a second lens having a negative refractive power, a third lens having a positive refractive power, and a fourth lens having a negative refractive power, wherein the third and fourth lenses respectively comprise at least one aspherical surface, and the negative refractive power of the fourth lens gradually decreases from the center of the fourth lens toward the periphery of the fourth lens, wherein the micro lens satisfies the following condition:

$$1.0 < F/f1 < 2.5$$

wherein "F" represents a focal length of the micro lens, and f1 represents a focal length of the first lens.

2. The micro lens as claimed in claim 1, wherein the micro lens satisfies the following condition:

$$0.6 < f3/f1 < 2.0$$

wherein f3 represents a focal length of the third lens, and f1 represents a focal length of the first lens.

3. The micro lens as claimed in claim 2, wherein refractive indexes of the first, second, third and fourth lenses at d-lines are less than 1.6.

4. The micro lens as claimed in claim 3, wherein the first, second, third and fourth lenses are plastic lens.

5. The micro lens as claimed in claim 4, wherein both lens surfaces of the first, second, third and fourth lenses are aspherical.

6. The micro lens as claimed in claim 4, wherein both lens surfaces of the second, third and fourth lenses are aspherical.

7. The micro lens as claimed in claim 1, wherein the peripheral region of the fourth lens has positive refractive power.

8. The micro lens as claimed in claim 5, wherein the peripheral region of the fourth lens has positive refractive power.

9. The micro lens as claimed in claim 8, wherein the second lens is a biconcave lens.

10. The micro lens as claimed in claim 1, wherein the first lens is a biconvex lens.

11. A micro lens, from an object side to an image side, sequentially comprising a stop, a first lens having a positive refractive power, a second lens having a negative refractive power, a third lens having a positive refractive power, and a fourth lens having a negative refractive power, wherein the third and fourth lenses respectively comprise at least one aspherical surface, and the negative refractive power gradually decreases from the center to the periphery of the fourth lens, wherein refractive indexes of the first, second, third and fourth lenses at d-lines less than 1.6.

12. The micro lens as claimed in claim 11, wherein the micro lens satisfies the following condition:

$$1.0 < F/f1 < 2.5$$

wherein "F" represents a focal length of the micro lens, and f1 represents a focal length of the first lens.

13. The micro lens as claimed in claim 12, wherein the micro lens satisfies the following condition:

$$0.6 < f3/f1 < 2.0$$

wherein f3 represents a focal length of the third lens, and f1 represents a focal length of the first lens.

14. The micro lens as claimed in claim 13, wherein the first, second, third and fourth lenses are plastic lens.

15. The micro lens as claimed in claim 13, wherein the first, second, third and fourth lenses are aspherical.

16. The micro lens as claimed in claim 13, wherein the second, third and fourth lenses are aspherical.

17. The micro lens as claimed in claim 15, wherein the fourth lens has a periphery with positive refractive power.

18. The micro lens as claimed in claim 17, wherein the second lens is a biconcave lens.

19. The micro lens as claimed in claim 18, wherein the first lens is a biconvex lens.

* * * * *